March 3, 1936.  R. M. STORER  2,032,639
MOLD FOR FREEZING LIQUIDS OR SEMILIQUIDS
Filed April 26, 1932
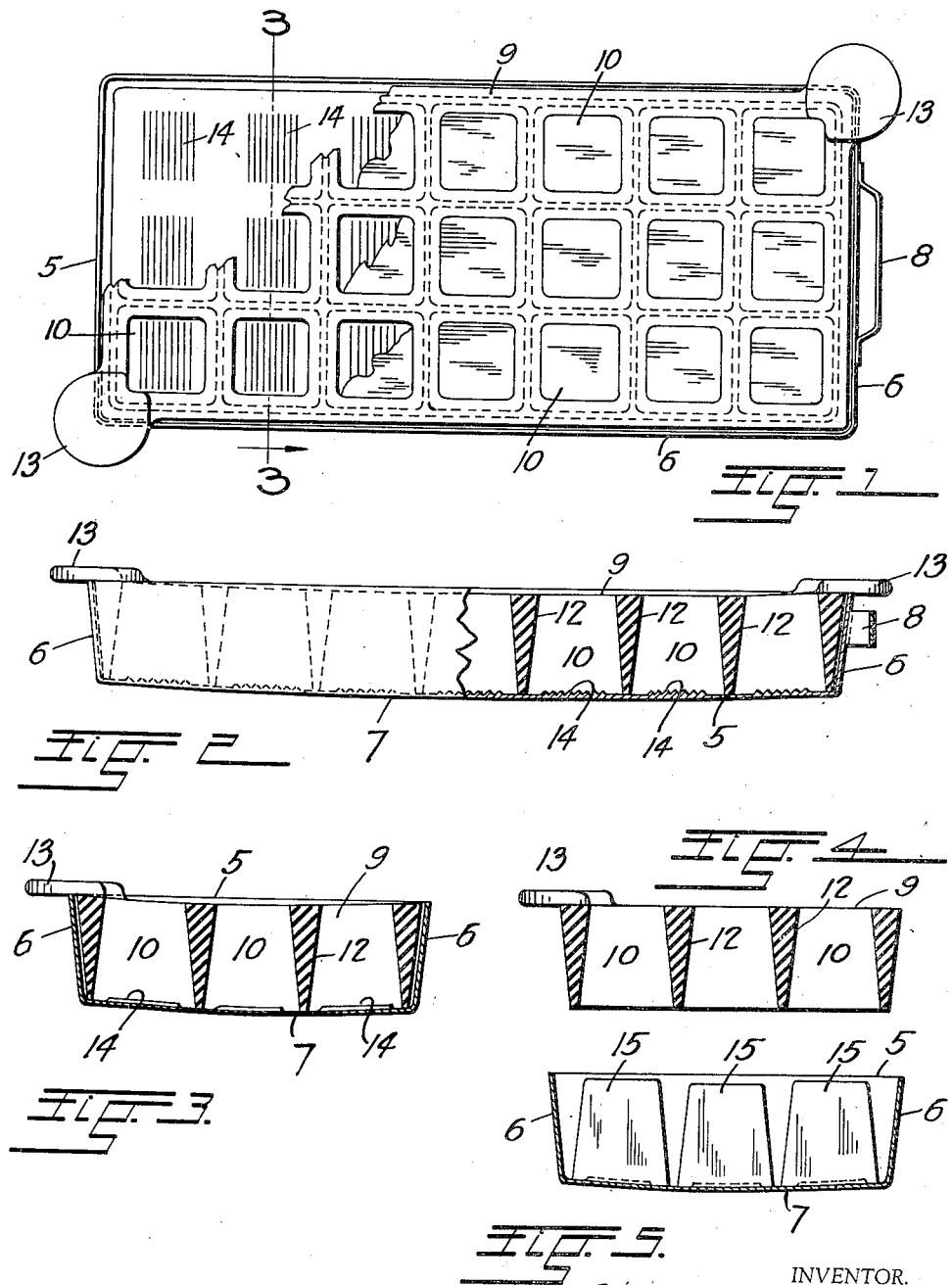
INVENTOR.
Richard M. Storer
BY
Rollandet & Stratton
ATTORNEYS Patented Mar. 3, 1936

2,032,639

UNITED STATES PATENT OFFICE 2,032,639

MOLD FOR FREEZING LIQUIDS OR SEMILIQUIDS

Richard M. Storer, Denver, Colo.

Application April 26, 1932, Serial No. 607,539

12 Claims. (Cl. 62—108.5)

This invention relates to improvements in molds for freezing liquids or semi-liquids, of the type used in electric refrigeration, its principal object being to provide a mold of simple construction which will facilitate the removal of frozen substances from the parts included in the mold.

The present invention relates more particularly to molds of the general character disclosed in my United States Patent Nos. 1,824,308 and 1,824,309, issued on the 22nd day of September, 1931, and it is a further object of the invention to provide certain variations of construction with reference to the disclosure of said patents, which involve a different method of operation in the use of the molds.

In the structure shown in the patents, a mold-member having a plurality of units of truncated pyramid form was employed in association with a pan or tray in which the mold was placed in an inverted position. The units were closed at their ends of smallest area, which were uppermost during the freezing process, and the mold-member was extricated from the frozen substances by expansion of the said substances while being frozen. Subsequently, the blocks of frozen substance were removed from the pan or tray by prying them off the bottom of the pan and likewise separating them from each other. In order to fill the mold with a liquid or semi-liquid to be frozen, it was necessary to place the pan upon the filled mold and then invert the two parts together before being placed in the freezing compartment of the refrigerator.

While the process and the means for carrying it into effect, as disclosed in the patents, are practical and effective, variations hereinafter to be described are equally efficient although they involve a somewhat different mode of operation. Novel steps and methods disclosed but not claimed in this application have been described and claimed in my copending application, Serial No. 25,814, filed June 10, 1935, for Method of forming ice cubes.

The differences reside mainly in that the mold is filled with a substance to be frozen after it has been placed in the tray; in that the mold may be removed from the frozen blocks by a progressive separative action; and in that the blocks may be separated from the bottom of the tray without the use of implements or a water immersion or other similar methods heretofore employed. I attain these results by providing a mold in the form of an open grid, of elastic material, the dividing walls of which are wedge-shaped to provide compartments of truncated pyramidal form which are open at both ends.

The grid fits in a tray made of metal or other suitable material, having a rigid wall and a normally downwardly bulging slightly resilient bottom, which after the grid has been removed from the frozen blocks may be sprung upwardly and thereby loosen the blocks for their separate removal.

An embodiment of the variations hereinbefore set forth, has been shown in the accompanying drawing, in the several views of which like parts are similarly designated, and in which Figure 1 represents a partially broken plan-view of the device with the parts thereof in their relative operative positions, Figure 2, a partially sectional side-elevation of the same, Figure 3, a transverse section taken on the line 3—3 of Figure 1, Figure 4, a similar section of the grid of the device, separate from the tray of the same, and Figure 5, a similar view of the tray with the frozen blocks in place, after the grid has been removed.

Referring further to the drawing, the reference character 5 designates the pan made of metal or other suitable material having an outwardly sloping rigid wall 6, a downwardly curving slightly resilient bottom 7, and a handle 8 to facilitate its manipulation.

The grid 9 which fits inside the pan is made of rubber or other elastic material, so that it may bend when pulled away from the tray. The grid is divided into a series of freezing compartments 10 of truncated pyramid form by intersecting walls 12 of wedge-shaped section, and it has at diagonally opposite ends outwardly projecting tabs 13 to facilitate its manual removal from the pan.

In order to hold the frozen bodies to the bottom of the tray while the grid is being removed, the inner surface of the bottom has been roughened by corrugations 14 corresponding in relative positions with the compartments of the grid. The freezing compartments of the grid are open at both ends so that they may be filled with the substance to be frozen with the grid in place in the pan, as shown in Figures 1 to 3 of the drawing. The filled device is subjected to a freezing temperature by placing it in the "frost unit" of a mechanical or electrical refrigerator and after the contents of the compartments of the grid are frozen, the latter is easily removed from the frozen bodies by pulling it upwardly by means of one of its tabs.

The elasticity of the grid and the wedge-shape of its walls causes it to easily separate from the series of blocks of frozen matter in a gradual progressive movement from one end to the other.

The bodies of frozen matter, shown at 15 in Figure 5, remain in place on the bottom of the pan or tray, partially by their natural adherence thereto and partially by the locking action of the corrugations 14, and when it is desired to remove one or more of the bodies from the pan, the resilient bottom 7 of the latter is sprung upwardly by hand-pressure, thereby loosening the bodies from the pan and from each other, so as to permit of their individual removal. This may be easily accomplished by placing the pan on a level surface and then pushing downwardly on the rigid wall of the same. When the pressure is released the bottom will spring naturally to its original bulging form.

It will be understood that the mold as shown and described may be used for freezing desserts of semi-liquid character, as well as water or other liquids, particularly in view of the fact that the grid may be removed from the pan and the frozen bodies separated from the same without the use of tools or water, as has been required in other molds used heretofore. It is also apparent that grids of the character herein disclosed may be used in connection with metal trays already in use in electrical or mechanical refrigerators.

What I claim and desire to secure by Letters Patent is:

1. A device of the character described, comprising a tray member having a rigid wall and a resilient downwardly bulging bottom, and a bendable grid adapted to be separated from ice cubes in the tray, and composed of intersecting wall members dividing the grid into a series of open-ended compartments, the tray bottom being interiorly roughened beneath said compartments.

2. A device of the character described, comprising a tray having rigid sides, a bendable grid removably fitted therein and composed of intersecting wedge-shaped wall-members, the outer walls of the grid forming a rim adjoining the sides of the tray, and lifting tabs at upper diagonal corners of the rim.

3. A device of the character described, comprising a tray having sloping sides, a bendable grid removably fitted therein and composed of intersecting wedge-shaped wall-members, the outer walls of the grid forming a rim adjoining the sides of the tray, and lifting tabs at upper diagonal corners of the rim.

4. A device of the character described, comprising a tray having sloping sides, a bendable grid removably fitted therein and composed of intersecting wall-members, the outer walls of the grid forming a rim adjoining the sides of the tray, and lifting tabs at upper diagonal corners of the rim.

5. In a device of the character described, a tray and a removable grid composed of intersecting wall-members dividing the tray into compartments, the tray having a resilient downwardly bulging bottom common to all the compartments and having corrugations registering with the compartments for the retention of the ice cubes during removal of the grid.

6. In a device of the character described, a tray and a removable grid composed of intersecting wall-members dividing the tray into compartments, the tray having a resilient downwardly bulging bottom common to all compartments, lifting tabs at upper diagonal corners of the grid to assist in its removal, and the bottom of the tray having corrugations registering with the compartments for the retention during removal of the grid, of material frozen in the compartments.

7. A device of the character described, comprising a tray having rigid sloping sides, a flexible grid having side-walls removably fitted against the sides of the tray and intersecting wall-members dividing the tray into compartments, the tray having a resilient downwardly bulging bottom common to all compartments, and means for flexing the grid while in place relative to the tray with frozen matter inside the compartments to permit its removal from the tray prior to removal of the frozen matter from the tray by flexure of the bottom.

8. A device of the character described, comprising a heat-conducting tray, and a flexible grid removably fitted therein and dividing the tray into compartments, the tray having on its bottom surface means for holding matter frozen in the compartments in place, during removal of the grid by flexure.

9. A device of the character described, comprising a heat-conducting tray having a bulging bottom, a flexible grid removably fitted therein and dividing the tray into compartments, and means associated with the bulging bottom for holding matter frozen in said compartments in place, during removal of the grid by flexure.

10. A device of the character described, comprising a tray having rigid sides, and a bendable grid removably fitted therein and composed of intersecting wedge-shaped wall-members, the outer walls of the grid forming a rim adjoining the sides of the tray.

11. A device of the character described, comprising a tray having sloping sides, and a bendable grid removably fitted therein and composed of intersecting wedge-shaped wall-members, the outer walls of the grid forming a rim adjoining the sides of the tray.

12. A device of the character described, comprising a tray having sloping sides, a bendable grid removably fitted therein and composed of intersecting wedge-shaped wall-members, the outer walls of the grid forming a rim adjoining the sides of the tray, and tab-means of the grid for flexing the grid while in place relative to the tray with frozen matter between the wall-members, to permit its removal from the tray prior to the removal of the frozen matter from the tray.

RICHARD M. STORER.